US011465036B2

(12) United States Patent
O'Neill et al.

(10) Patent No.: US 11,465,036 B2
(45) Date of Patent: Oct. 11, 2022

(54) PENCIL SPINNER

(71) Applicants: Patrick Allen O'Neill, Laurel, MD (US); Michele O'Neill, Laurel, MD (US)

(72) Inventors: Patrick Allen O'Neill, Laurel, MD (US); Michele O'Neill, Laurel, MD (US)

(*) Notice: Subject to any disclaimer, the term of this patent is extended or adjusted under 35 U.S.C. 154(b) by 262 days.

(21) Appl. No.: 16/252,885

(22) Filed: Jan. 21, 2019

(65) Prior Publication Data

US 2020/0230492 A1   Jul. 23, 2020

(51) Int. Cl.
*A63F 11/00* (2006.01)
*A63F 3/04* (2006.01)

(52) U.S. Cl.
CPC ........ *A63F 3/0457* (2013.01); *A63F 11/0011* (2013.01); *A63F 2003/046* (2013.01); *A63F 2011/0016* (2013.01)

(58) Field of Classification Search
CPC ...... A63F 2011/0016; A63F 2011/0018; A63F 2011/002; A63F 2011/0023; A63F 11/0011
USPC ..... 273/141 R, 141 A, 138.1; D21/347, 374; 434/198
See application file for complete search history.

(56) References Cited

U.S. PATENT DOCUMENTS

| | | | |
|---|---|---|---|
| 1,167,407 A * | 1/1916 | Johnson | 273/141 R |
| 1,513,500 A * | 10/1924 | Greig | A63F 5/04 273/141 R |
| 1,542,874 A * | 6/1925 | Hampel | A63F 5/04 273/109 |
| 1,578,632 A * | 3/1926 | Bommer | A63F 3/00031 273/244.1 |
| 1,592,877 A * | 7/1926 | Weston | A63F 5/04 273/244.1 |
| 1,632,673 A * | 6/1927 | Paulus | A63F 5/04 273/274 |

(Continued)

FOREIGN PATENT DOCUMENTS

| | | | | |
|---|---|---|---|---|
| GB | 196338 A | * | 4/1923 | A63F 3/00082 |
| GB | 2159423 A | * | 12/1985 | A63F 3/00006 |

OTHER PUBLICATIONS

You Tube Video "The Spinner Game", https://www.youtube.com/watch?v=d4g1FV_bhTo, (Year: 2011).*

*Primary Examiner* — Joseph B Baldori
(74) *Attorney, Agent, or Firm* — Rahman LLC

(57) ABSTRACT

A portable rotatable spinner to be used in combination with a pencil and an educational curriculum worksheet, where the worksheet incorporates a spinner-type game board image, and where the game board is used by students to generate random results or data. The spinner has an arrow-shaped body. Located midpoint of the body is an integrally-formed, vertically-oriented cylinder. The cylinder extends symmetrically from the upper and lower surfaces of the body. Through the cylinder is a hole or aperture. The aperture has an internal diameter slightly larger than the diameter of a pencil. In use, the spinner is placed on top of the worksheet and aligned over the game board. A pencil is inserted through the spinner. One hand holds the pencil vertically while the other hand flicks the spinner. The spinner rotates freely about the pencil until coming to a rest.

1 Claim, 1 Drawing Sheet

(56) References Cited

U.S. PATENT DOCUMENTS

| | | | | |
|---|---|---|---|---|
| 1,676,410 A | * | 7/1928 | Paul | A63F 5/043 |
| | | | | 273/141 R |
| 2,224,996 A | * | 12/1940 | Walsh | A63F 5/04 |
| | | | | 273/141 R |
| D144,201 S | * | 3/1946 | Kleinberg | D21/374 |
| 2,430,120 A | * | 11/1947 | Gihon | A63F 5/04 |
| | | | | 273/141 R |
| 2,546,441 A | * | 3/1951 | Guthmann | A63F 5/048 |
| | | | | 273/109 |
| 2,945,696 A | * | 7/1960 | Johanningmeier | A24F 27/12 |
| | | | | 446/256 |
| 2,995,374 A | * | 8/1961 | Deatherage | G09B 17/00 |
| | | | | 273/248 |
| 3,083,498 A | * | 4/1963 | Kelley | A63H 1/16 |
| | | | | 446/256 |
| 3,545,758 A | * | 12/1970 | Payne, Jr. | A63F 3/00041 |
| | | | | 273/141 R |
| 3,861,077 A | * | 1/1975 | Lindquist | A63H 33/22 |
| | | | | 401/52 |
| 3,933,357 A | * | 1/1976 | Mercer | A63F 5/04 |
| | | | | 273/141 R |
| 4,243,223 A | * | 1/1981 | Ver Hoef | A63F 11/0011 |
| | | | | 273/141 R |
| 4,371,165 A | * | 2/1983 | Tammen | A63F 5/04 |
| | | | | 273/147 |
| 4,834,372 A | * | 5/1989 | Velazquez | A63F 9/16 |
| | | | | 446/259 |
| 4,930,789 A | * | 6/1990 | Harris | A63F 3/00157 |
| | | | | 273/141 R |
| 5,217,225 A | * | 6/1993 | Dubarry, Jr. | A63F 11/0011 |
| | | | | 273/141 R |
| 5,324,226 A | * | 6/1994 | McKay | A63H 1/16 |
| | | | | 446/256 |
| 5,676,374 A | * | 10/1997 | Bossa | A63H 13/20 |
| | | | | 273/287 |
| 6,095,520 A | * | 8/2000 | Willkow | A63F 1/06 |
| | | | | 273/148 R |
| 6,116,982 A | * | 9/2000 | Roman | A63H 33/26 |
| | | | | 446/131 |
| 6,322,072 B1 | * | 11/2001 | Mair | A63F 11/0011 |
| | | | | 273/141 R |
| 6,769,688 B1 | * | 8/2004 | Lean | A63H 1/00 |
| | | | | 273/148 R |
| 2016/0187169 A1 | * | 6/2016 | Gil Paredes | G01D 13/02 |
| | | | | 116/288 |

\* cited by examiner

PENCIL SPINNER

| The following is a tabulation of prior art: | | | |
|---|---|---|---|
| Patent Number | Title | Issue Date | Patentee |
| 4,243,223 | Spinner Apparatus | Jan. 6, 1981 | Ver Hoef, et al |
| 5,217,225 | Board Game Spinner Assembly | Jun. 8, 1993 | Dubarry, Jr. |

Due to the wide availability of online educational resources, classroom teachers often download curriculum materials from the Internet. These downloads are printed and distributed to the students as worksheets.

Some of the worksheets include the image of a spinner-type game board. Students use the game board to generate random results or data. The results or data are then used to complete the worksheet.

A spinner-type game board is often of circular shape and is divided into pie shaped sections. Each section of the game board is labeled with the unique features required by the worksheet, such as words, letters, numbers, instructions, or pictures.

To use a worksheet game board, the teacher must provide the students with a rotating spinner. Many teachers create a rotating spinner using a paper clip and a pencil. The paper clip is placed on top of the worksheet. One end of the paper clip is aligned at the center of the game board image. The pointed end of a pencil is placed at the center of the game board image and within the end of the paper clip. One hand holds the pencil vertically while a finger from the other hand is used to flick the paper clip. The paper clip rotates freely around the pencil until coming to rest over a section of the game board, indicating the result of the spin.

A disadvantage of this method is that the paper clip rests directly on the game board. Because paper clips are thin, it is difficult to strike the paper clip without simultaneously striking the game board. Another disadvantage is that students are inclined to bend the paper clip, creating a source of distraction and exposing a sharp, unsafe end of the paper clip.

The purpose of the present invention is to improve upon the paper clip method and provide a portable rotatable spinner. Several portable rotatable spinners have been described in prior art. These devices consist of a free-spinning arrow-shaped indicator mounted onto a base. The major drawback of the prior art is that the devices require a means of affixing to the game board.

Ver Hoef has suggested a spinner/indicator device that is mounted via a suction cup. While this device may stay affixed to a rigid game board, it will not adhere to a sheet of printer paper. In addition, the suction cup may be a source of distraction to students.

Dubarry, Jr. has suggested a spinner assembly that is affixed using a weighted base. Unfortunately, the large diameter of the weighted base covers the center section of the game board, making it difficult for students to read the results of the spin. In addition, a weighted device is not ideal for use in the classroom, where the teacher will need to distribute and collect the devices.

The present invention addresses these drawbacks and advances the art. The present invention is one component, simple, lightweight and does not use an integral means of affixing to the game board. Instead, the invention uses a secondary device, a pencil, to stay positioned on the game board. The device has a narrow center section that allows a clear view of the game board. The device is elevated above the game board, allowing the user to strike the device without simultaneously striking the game board.

BRIEF DESCRIPTION OF THE SEVERAL VIEWS OF THE DRAWINGS

The figures in the drawings are briefly described as follows.

DETAILED DESCRIPTION OF THE INVENTION

Figure 1:
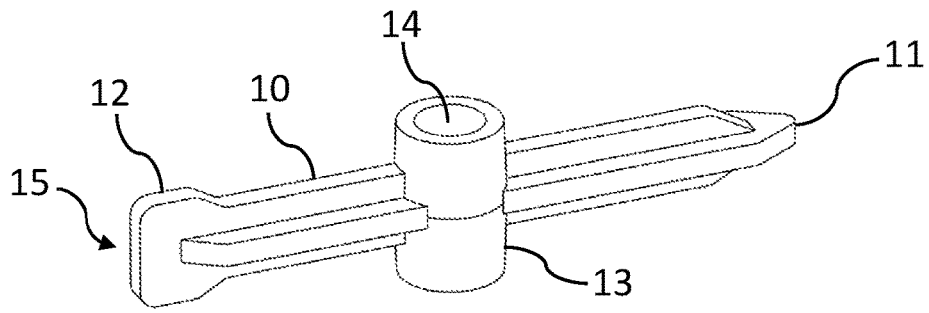
FIG. 1 is a perspective view of the device of the present invention.
Figure 2:
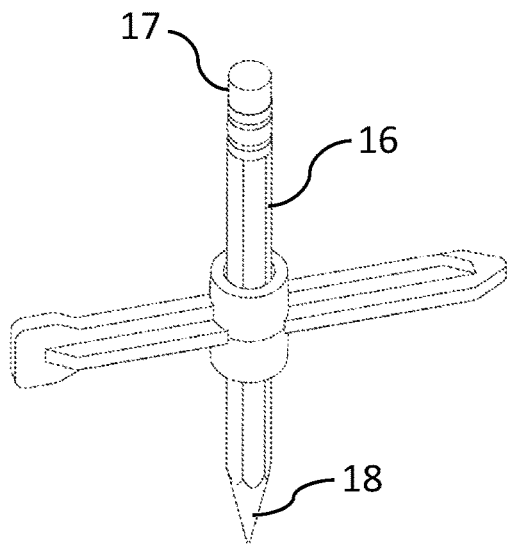
FIG. 2 is a perspective view of the device of the present invention shown placed over a pencil.

FIGS. 1 and 2 illustrate a pencil spinner 15. The spinner 15 has an arrow-shaped body 10 with a pointed forward end 11 and an enlarged rearward end 12. Located midpoint is an integrally-formed, vertically-oriented cylinder 13 that extends symmetrically from the upper and lower surfaces of the body 10. Through the cylinder 13 is a hole or aperture 14 having an internal diameter slightly larger than the diameter of a pencil 16.

Additional details of the invention include:

The integrally formed cylinder 13 extends symmetrically from the horizontal centerline of the spinner such that the forward and rear sections of the spinner are not in contact when the spinner is placed on a flat surface. This clearance between the spinner and flat surface minimizes friction and allows the spinner to spin freely even if the pencil is held misaligned from vertical.

The spinner is symmetrical about the horizontal centerline. A user is not required to orient a specific side of the spinner up.

The center of gravity of the spinner is located at the center of the aperture 14.

The shaft of the pencil can be round, hexagon, or of alternate shape. The fit between the pencil and spinner is such that no frictional resistance exists.

The spinner can rotate easily about the pencil, regardless of whether the eraser 17 or point 18 is in contact with the game board.

To assist the user in determining the result of a spin, the forward end 11 of the body can be of a different color than the rest of the spinner. This may aid teachers in guiding students during use of the spinner.

Figure 3:
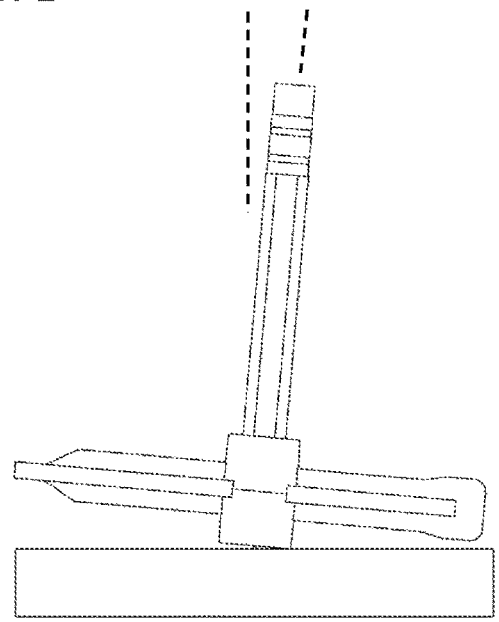
FIG. 3 is a perspective view of the device of the present invention, shown tilted at an angle from vertical.
Figure 4:
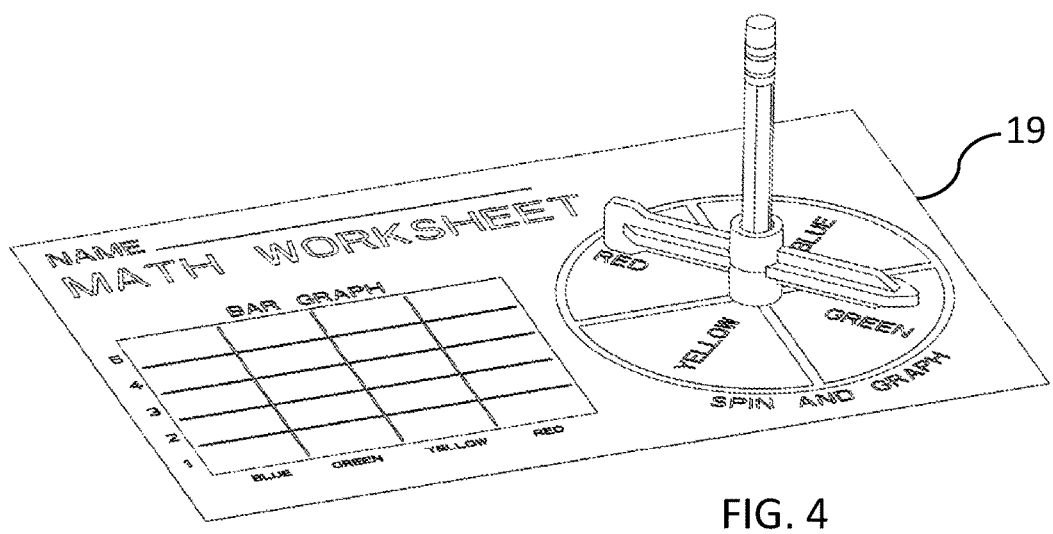
FIG. 4 is a perspective view of the device, shown on a spinner game.

Operation— FIGS. 2-4

In use, the worksheet 19 is placed on a flat hard surface such as a desk or table. The spinner is placed on top of the worksheet and is positioned over the game board. A pencil is held vertically and inserted through the spinner. One hand holds the pencil vertically while a finger from the other hand is used to flick the spinner. The spinner rotates freely around the pencil until coming to rest. The result of the spin is determined by observing which section of the game board the pointed-end of the spinner has stopped above. After the spin is complete, if the pencil is needed to record a result, the user can lift the pencil out of the spinner, while leaving the spinner in place on the game board.

ALTERNATIVE EMBODIMENTS

Although the invention has been described and illustrated with respect to a preferred embodiment thereof, it is to be understood that it is not to be so limited since changes and modifications may be made therein which are within the full-intended scope of the invention.

What is claimed is:

1. A portable spinnable device comprising:
a symmetrical bifurcated body comprising:
   a first end comprising a pointed tip, wherein the pointed tip comprises a first width and a first height; and
   a second end comprising a tailfin, wherein the tailfin comprises a second width and a second height, wherein the first width is greater than the second width, and wherein the second height is greater than the first height,
a hollow cylinder integrally-formed at a midpoint of the symmetrical bifurcated body and extending symmetrically from an upper surface and a lower surface of the symmetrical bifurcated body, wherein the cylinder comprises a hole fully extending through a central axis of the cylinder, wherein the hole is configured to loosely accommodate a longitudinal member, wherein a top of the hollow cylinder extends higher than a top of the pointed tip of the first end and the tailfin of the second end of the bifurcated body, and wherein a bottom of the hollow cylinder extends lower than a bottom of the pointed tip of the first end and the tailfin of the second end of the bifurcated body.

\* \* \* \* \*